(12) United States Patent
Fischer et al.

(10) Patent No.: US 6,648,959 B1
(45) Date of Patent: Nov. 18, 2003

(54) COLORING PIGMENT

(75) Inventors: Hartmut Rudolf Fischer, Mierlo (NL); Lawrence Fabian Batenburg, Eindhoven (NL)

(73) Assignee: Nederlandse Organisatie voor toegepast-natuurwetenschappelijk Onderzoek TNO (NL)

( * ) Notice: Subject to any disclaimer, the term of this patent is extended or adjusted under 35 U.S.C. 154(b) by 0 days.

(21) Appl. No.: 10/030,349

(22) PCT Filed: Jul. 7, 2000

(86) PCT No.: PCT/NL00/00480
§ 371 (c)(1),
(2), (4) Date: Apr. 24, 2002

(87) PCT Pub. No.: WO01/04216
PCT Pub. Date: Jan. 18, 2001

(30) Foreign Application Priority Data

Jul. 13, 1999 (NL) ............................................ 1012587
Oct. 22, 1999 (NL) ............................................ 1013373

(51) Int. Cl.[7] ............................................. C04B 14/10
(52) U.S. Cl. ..................................... 106/487; 406/493
(58) Field of Search ................................. 106/487, 493

(56) References Cited

U.S. PATENT DOCUMENTS

| | | | |
|---|---|---|---|
| 3,950,180 A | * | 4/1976 | Kato .......................... 106/468 |
| 4,410,364 A | | 10/1983 | Finlayson et al. |
| 5,296,284 A | * | 3/1994 | Durham ...................... 428/207 |
| 6,486,254 B1 | | 11/2002 | Barbee et al. |

FOREIGN PATENT DOCUMENTS

| | | |
|---|---|---|
| DE | 23 38 759 A1 | 2/1975 |
| DE | 33 01 247 A1 | 7/1983 |
| DE | 33 29 817 A1 | 1/1984 |
| EP | 0 206 800 A2 | 12/1986 |
| EP | 0 395 006 A2 | 10/1990 |
| EP | 0 506 034 A1 | 9/1992 |
| WO | WO 89/09804 | 10/1989 |
| WO | WO 92/00355 | 1/1992 |
| WO | WO 00/34379 | 6/2000 |

OTHER PUBLICATIONS

XP 2133442, Database WPI week 7546, Pigment preparation–from bentonite and basic dyes, Derwent Publications Limited, Jun. 16, 1975.

* cited by examiner

*Primary Examiner*—C. Melissa Koslow
*Assistant Examiner*—Shalie Manlove
(74) *Attorney, Agent, or Firm*—Muserlian, Lucas and Mercanti, LLP

(57) ABSTRACT

This invention relates to a method for preparing a coloring pigment, wherein an anionic or cationic clay, which clay contains substantially no agglomerates of clay sheets, is subjected to an ion exchange with an organic dye. The invention further relates to a coloring pigment and the use thereof for coloring substrates.

11 Claims, 1 Drawing Sheet

COLORING PIGMENT

Figure 1:
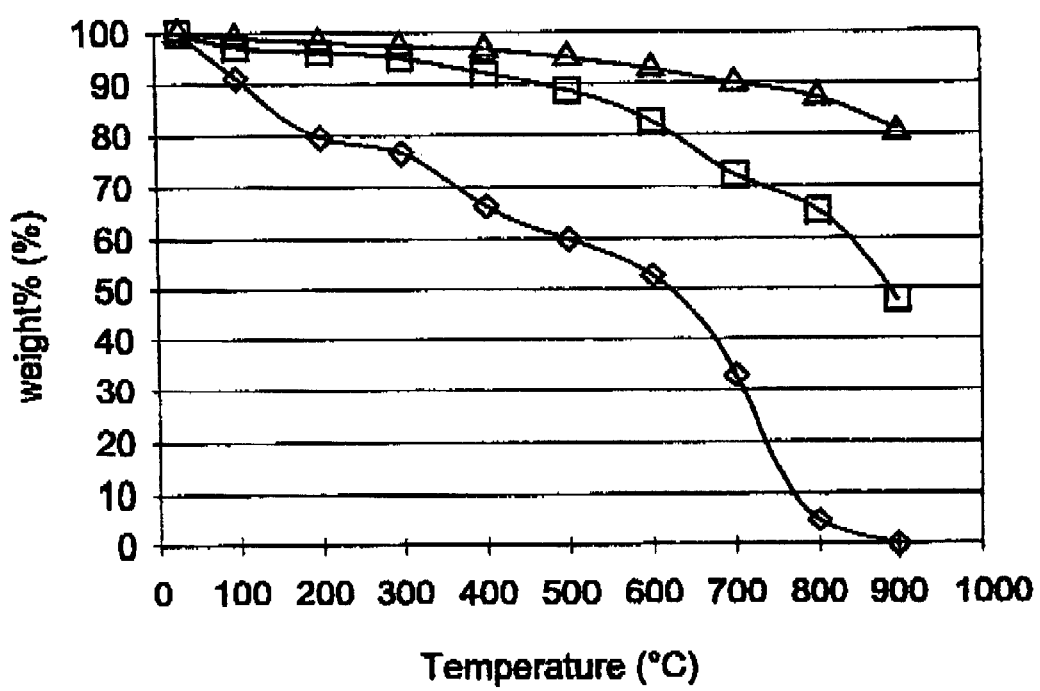

This invention relates to a method for preparing a coloring pigment. This invention further relates to a coloring pigment and the use thereof for coloring substrates.

In the context of the invention, a coloring pigment is understood to mean a substance which can give a particular, desired color to a substrate of another material. In addition to color, a coloring pigment gives coverage and it improves the durability of the substrate, in that a part of the incident light is absorbed and/or reflected. According to the invention, a coloring pigment is therefore distinct from a dye. Although a dye is capable of giving coloring to a substrate, it does not have the other properties mentioned, Which a coloring pigment does have.

Polymeric materials are normally colored with inorganic pigments. These provide a good color stability to light, oxygen and heat. As regards color and color intensity, however, these pigments have their limitations. In addition, inorganic pigments are less desirable for environmental reasons. Many inorganic pigments, for instance, contain heavy metals.

Organic pigments not only offer a wider range of color possibilities with higher intensities, but are also broken down faster and better in the environment, for instance under the influence of oxygen. A major disadvantage of organic dyes, however, is that they have a relatively low temperature and UV stability. Moreover, these substances exhibit the tendency to leach out when substrates colored with them are wed.

In the literature, attempts to combine the advantages of the known inorganic and organic pigments have already been described. U.S. Pat. No. 3,950,180 discloses a composite material which is based on an organic, basic dye and a mineral, viz. a zeolite or montmorillonite. It has been found, however, that the dye is not very homogeneously distributed over the mineral. Nor can a substrate be colored sufficiently homogeneously with such a composite material.

The international patent application 92/00366 describes a coloring pigment based on a layered double hydroxide and a water-soluble, anionic dye. According to a first possibility, this coloring pigment is prepared by calcination of the layered double hydroxide, so that carbonate ions between the clay sheets are driven out, and subsequent subjection to ion exchange with the dye. According to a second possibility, the layered double hydroxide is formed in situ in the presence of the dye. In the coloring pigment which is obtained according to one of the two possibilities, the dye is also not homogeneously distributed over the clay (the layered double hydroxide). With this coloring pigment, too, a substrate cannot be colored sufficiently homogeneously.

In the international patent application 89/09804, a coloring pigment is described which is based on a combination of a mineral material and an organic pigment. Although the mineral material is broadly defined, the document in fact only shows the use of hectorite. A hectorite slurry is prepared which is heated with stirring for half an hour to 80° C., whereafter an organic pigment is the form of an aqueous solution is added. What is described is that the thus obtained coloring pigment can be used for coloring a variety of materials, such as plastic and rubber composition. In the examples, only the coloring of polypropylene is shown.

Presently, it has been found that for the coloring of particular materials, such as non-polar materials (polymers) or polar materials (polymers). The coloring pigment described in WO-A-89/09804 is not sufficiently suitable. The coloring pigment proves difficult or impossible to distribute homogeneously in the material to be colored, which results in an unsatisfactory color quality.

It is an object of the invention to provide a coloring pigment which combines the advantages of the known organic pigments with those of the known inorganic coloring pigments; and with which polymeric materials can be colored in an efficient, homogeneous manner. Contemplated is a class of coloring pigments with which a large number of diverse colors of high intensity can be given to a polymer substrate, which coloring pigments can be broken down properly and fast in the environment. Further, the coloring pigment should be stable under the influence of light, oxygen and but. It is another object of the invention to provide a coloring pigment which can be incorporated in a homogeneous manner in a large variety of materials to be colored, so that a colored material with an intense color in an optimum color quality is obtained.

Surprisingly, it has presently been found that the stated objects can be achieved by preparing a coloring pigment in a specific manner from as organic dye and a day. Accordingly, the invention relates to a method for preparing a coloring pigment, wherein an anionic or cationic clay, which clay contains substantially no agglomerates of day sheets, is subjected to an ion exchange with an organic dye.

It has been found that the present method leads to a coloring pigment with a very high intensity. In other words, to obtain the same color intensity as with a coloring pigment from the prior art, a much smaller quantity of coloring pigment can suffice. Further, any color shade can be achieved that can also be created with known organic pigments. Another great advantage of the invention is that the coloring pigment can be incorporated into substrates very well. A very homogeneous color effect is obtained, while substantially no individual coloring pigment particles are perceptible. Leaching out of the coloring pigment does not occur, at least occurs to a much lesser extent than in the known organic pigments. Further, the present coloring pigment is very stable, in comparison with organic dyes, under the influences of light, oxygen and heat, and does not yield any, or hardly any, environmental hazard.

The clay which is used in the present method is an anionic or a cationic clay. In principle, any anionic or cationic clay obtained synthetically or from a natural source can be used. Suitable examples can be selected from the classes of smectites, hydrotalcites and layered double hydroxides. Particularly preferred are cationic clays, such as sodium or hydrogen montmorillonite, and hydrotalcites.

As already indicated hereinabove, it is an important aspect of the invention that the clay contains substantially no agglomerates of clay sheets. All clay types consist of a sheet structure. Under normal conditions, these sheets form agglomerates, whereby the clay sheets stack onto each other. According to the invention, these agglomerates are to be substantially broken, so that the relative distance between the clay sheets is at least 50 Å, preferably at least 75 Å, and still more preferably at least 100 Å. This distance can be suitably determined using x-ray diffraction techniques.

An example of a suitable procedure for breaking the agglomerates in the clay, i.e., for deagglomeration, is a method whereby the clay is dispersed in, preferably, water that is substantially free of ions. This water preferably has a temperature of 20–40° C. Preferably, the amount of clay is not more than 10% by weight, based on the dispersion, so that the viscosity remains low. This has a positive effect on the processability of the dispersion. Thereafter, the clay is allowed to swell for a period between half an hour and a few hours. Other methods to break the agglomerates in the clay are known to those skilled in the art.

Under certain circumstances, in particular when the coloring pigment to be prepared is to be used for coloring non-polar materials (polymers), it may be desirable to modify the clay and/or the finished coloring pigment.

In this connection, it is noted that according to the invention the classification of a material to be colored into the group of polar or non-polar materials is based on a solubility parameter. This is a parameter in which dispersive and polar properties, as well as the presence of hydrogen bridges, of a material are expressed. According to the invention, when the solubility parameter is 9.5 or higher, a polar material is involved. A solubility parameter lower than 9.5 is indicative of a non-polar material. For a description of the solubility parameter and how it can be determined, reference is made to the book "Properties of Polymers" by Van Krevelen, $2^{nd}$ edition, Elsevier, Amsterdam, 1976. For the sake of completeness, solubility parameters of a few materials are presented in Table 1 below.

The modification of the clay to render the coloring pigment contemplated outstandingly suitable for coloring non-polar materials can be carried out by adding to the clay and/or to the finished coloring pigment a surfactant, a block copolymer or a graft copolymer. Although not requisite, it is preferred that the modification be carried out before the day is subjected to an in exchange with the dye.

TABLE 1

Solubility parameters of a few materials

| | | Solubility parameter |
|---|---|---|
| Non-polar polymers | polyethylene | 7.7–8.4 |
| | polypropylene | 8.2–9.2 |
| | polystyrene | 8.5–9.3 |
| Polar polymers | polymethyl methacrylate | 9.1–12.8 |
| | polyacrylonitrile | 12.5–15.4 |
| | polyvinyl chloride | 9.4–10.8 |
| | polyamide 6 | 12.7 |
| Solvents | hexane | 8.2 |
| | chloroform | 9.3 |
| | acetone | 9.9 |
| | methanol | 14.5 |
| | water | 23.4 |

Suitable examples of surfactants are quaternary ammonium compounds, such as octadecylammonium bromide, (ar)alkylsulfonic acids and sulfates, such as dodecyl sulfate, alkylcarboxylic acids, and pyridinium and phosphonium compounds. The pyridinium and phosphonium compounds preferably possess two non-polar tails bound to a head group. The non-polar tails an preferably alkyl groups which, like the alkyl groups in the other surfactants mentioned, preferably comprise at least six carbon atoms. The alkyl groups will normally not be longer than 24 carbon atoms, although this limit is determined by economic rather than technical motives.

Suitable block and graft copolymers are built up from a hydrophilic and a hydrophobic part. Preferably, they contain two blocks, am of which is compatible with the clay and the other with the material to be colored. The block compatible with clay will typically have a molecular weight of 5,000 or less. The block compatible with the material to be colored will typically have a molecular weight of 20,000 or less. The choice for the two blocks can be suitably made by those skilled in the art on the basis of the nature of the clay and the material to be colored. It has been found that the use of polyethylene oxide blocks is of particular advantage.

The amount of surfactant, block copolymer or graft copolymer depend on the type of pigment and the substrate to be colored. Normally, this amount will be between 0 and 90, preferably between 5 and 30 mol. %, based on the amount of day (CEC, see infra).

As mentioned, the described modification of the clay is especially advantageous when a non polar materiel is to be colored. Examples of non-polar materials where this modification leads to particularly good results are polyolefins, such as polyethylene and polypropylene. It his been found that a surprisingly homogeneous coloring with a high color intensity is achieved.

The day thus obtained is subjected to an ion exchange with an organic dye which yields the desired color. The organic dye is preferably an ionic dye, so that the ion exchange can be carried out in a simple manner. Examples of suitable dyes are mentioned in Ullmanns Encyklopadie der technische Chemie, band 11, Verlag Chemie, Weiheim, 1976 under "Farbstofen" and comprise acridine dyes, anthraquinone dyes, azine (inch. Oxazine and Thiazine) dyes, azo dyes, quinophthalone dyes, natural dyes, formazan dyes, indigo and indigoid dyes, indicator dyes, cationic dyes, Woo vat dyes, methine (including Azometbine) dyes, microscoping dyes, naphtho and benaoquiaoae dyes, nitro and nitroso dyes, phthalocyanine dyes, reactive dyes, and tri- and diaryl methane dyes. Suitable organic dyes are coloristically divided into the following groups (see Ullman Band 11): direct dyes, developer dyes, oxidation dyes, cationic (basic) dyes, vat dyes, leuco vat dyes, reactive dyes, and acid dyes.

Preferred are cationic and anionic dyes and dyes which am be brought into cationic or anionic form by protonating or deprotonating. These are, for instance, dyes with $N^+$, $F^+$, $S^+$ functionalities and/or derivatives thereof. Additionally preferred an dyes with anionic functionalities such as $RCO_2-$, $RP(O)O_2^{2}$, and $RSO_3-$, wherein R is defined as an alkyl, aryl or alkylaryl group. Also preferred are dyes having a charge center.

When the coloring pigment to be prepared serves to color a polar material, such as a polar polymer, it is preferred that the dye possesses at least two functional or ionic groups. Examples of such groups are amino groups and add groups. Dyes that satisfy this criterion are inter alia methylene blue and methyl red.

The ion exchange can take place by adding to a dispersion of the clay in warm water, preferably the dispersion described above, a solution of the dye. The dye is preferably dissolved in water in a concentration of between 1% and 50%. The amount of dye that is used in the ion exchange is selected depending on the ion exchange capacity (CEC) of the day and molar mass and number of reactive groups of the dye. The color shade of the coloring pigment to be prepared can be set by means of the amount of dye. The pH of the dye solution is preferably between 2 and 10, depending on the selected type of clay and the dye, and can be set with suitable buffers.

An advantage of the invention is that the loading of the clay with the dye an be very high. The amount of dye per amount of day that can be achieved is significantly higher than that which can be achieved with the methods for preparing a coloring pigment based on day and an organic dye from the prior art. The amount of clay with respect to the amount of dye is preferably selected such that the coloring pigment coma as from 2 to 90% by weight, more preferably from 5 to 45% by weight of pigment.

After the ion exchange, the coloring pigment is preferably washed a few times with water and filtrated. If desired, the material can be dried, for instance in an oven or by spray-drying or freeze-drying, whereafter it can be ground to form a powder to improve processability.

The invention further relates to the use of the coloring pigment obtainable in the above-described manner for coloring substrates. It has been found that the coloring pigment is suitable in particular for coloring substrates of polymeric material. It is possible both to color bulk material and to color a covering layer or coating of a polymeric material. Polymers which have proved to allow of coloring particularly well are polyurethanes, poly(meth)acrylates, polyolefins, such as polyethylene or polypropylene, polyesters and polystyrene. As already described extensively, it is preferred that the coloring pigment further contains a surfactant, a block copolymer or a graft copolymer when non-polar materials are colored. When polar materials are colored, the coloring pigment is preferably based on a dye having at least two functional or ionic groups.

When the present coloring pigment is to be incorporated in a bulk material, it can be added to a melt of the material and/or be homogeneously distributed in the bulk material by means of shearing forces, for instance by extrusion. When the coloring pigment is to be processed into a covering layer or coating, it can be suitably added to the liquid material that is used for forming the covering layer or coating. In a conventional manner, this liquid material can then, after being properly stirred, be applied to a substrate and cured to form a coating. The substrate is this context can be of all kinds, such as polymer material, ceramic, glass, metal, wood, textile (clothing), and the like. Further, an application of the coloring pigment as a tracer for, for instance, flow profiles is possible by virtue of the small dimensions of the particles of which the coloring pigment consists.

A coloring pigment according to the invention can be distributed very homogeneously over a substrate, so that basically no coloring pigment particles are perceptible. The present coloring pigment timbre unites the properties of a pigment with those of a dye. The fact is that the coloring pigment consists of particles which are smaller than the wavelength of the light. For that reason the coloring pigment can also be designated by the term 'nanopigment'.

The color that can be given to a substrate is uncommonly intense and substantially does not run in any manner. It has further been found that the coloring pigment has a strengthening effect on a substrate. The colored substrate is considerably stabler under the influence of light, heat or oxygen and has improved mechanical properties, such as a greater tensile strength and impact resistance.

The invention will presently be further elucidated in and by the following examples.

Example 1

Ten grams of a montmorillonite clay EXM 767 with a cation exchange capacity of 95 meq./100 g were dispersed in 1 liter of deionized water of 50° C. The day, was allowed to swell for a period of 2 hours, until complete exfoliation had occurred. With x-ray diffraction it was determined that the distance between the clay sheets was 12.1 Å.

The clay thus obtained was subjected to as ion exchange with Methylene Blue (MB). For a complete exchange 3.0 grams of MB were used. This yielded a blue coloring pigment, which was washed, filtrated and freeze-dried. With x-ray diffraction, it was determined that the distance between the clay sheets was 15.6 Å.

Of this coloring pigment, a Thermal Gravimetric Analysis (TGA) was made using a device suitable for that purpose, obtainable from Perkin Elmer, to be able to compare the thermal stability of the coloring pigment with that of MB per se. The results of this are represented in FIG. 1. In FIG. 1 the line with the symbol —◆— shows the data obtained for pure methylene blue, the symbol —□— shows the corrected data obtained for methylene blue in clay, and —△— shows the actual data obtained for methylene blue in clay.

The obtained actual data were corrected for the amount of clay in the sample. Since the clay used contains about 24% MB, this was converted by calculation to ale amount of pure MB. It can be seen that the thermal stability of the coloring pigment obtained according to this example is at least 100 K higher than that of pure MB.

Example 1A 0.5 g of the coloring pigment prepared according to Example 1 was mixed with 9.5 g polyethylene powder of high density and a molecular weight of 300,000 g/mole (DOW Chemical Company) in an extruder with a twin screw and a kneading zone and melted at 160° C. and processed. The product was a material of a blue color, but had an in homogeneous distribution of the coloring pigment. A few pigment particles of a size of about 1–20 micrometers were clearly recognizable.

Example 1B 0.5 g of the coloring pigment mentioned in Example 1 was melted and homogeneously mixed in a kneader with a block copolymer comprising a block of polyethylene of a molecular weight of 665 g/mole and a polyethylene oxide block of a molecular weight of 210 g/mole. The material obtained was subsequently processed with 9.5 g polyethylene powder as described in Example 1A. The resulting product exhibited a remarkably better distribution of the coloring pigment. With the naked eye, no particles were recognizable. An inspection with electron microscopy showed an average particle size is the submicrometer range. The color of the colored polyethylene was virtually identical to the color of the coloring pigment (without polymer).

Example 2

The coloring pigment obtained in Example 1 was used in different coatings (paint):
  a water-based polyether polyurethane coating for concrete;
  a water-based polycarbonate polyurethane coating for metal;
  a water-based polyacrylate coating for metal; and
  an isopropanol-based hybrid silicate coating for scratch protection of steel.

In each coating the coloring pigment was included in three concentrations: 1, 2 and 5% by weight. This was done by dispersing the coloring pigment in the paint using ultrasound activation. After a few hours, a substrate was painted with the coatings and these were cured. The color intensity and homogeneity of the coatings was very high. By light microscopy no inhomogeneities could be observed in the coatings.

Example 3

Ten grams of a montmorillonite clay EM 757 with a cation exchange capacity of 95 meq./100 g was dispersed in 1 liter of deionized water of 50° C. The clay was allowed to swell for a period of 2 hours, until complete exfoliation had occurred. With x-ray diffraction it was determined that the distance between the clay sheets was 12.1 Å.

The clay thus obtained was subjected to an ion exchange with Methyl Red (MR). For a complete exchange, 2.6 grams of MR were used. This yielded a red coloring pigment, which was washed, filtrated ad freeze-dried. With x-ray diffraction, it was determined that the distance between the clay sheets was 23.9 Å.

Example 4

The coloring pigment obtained in Example 3 was used in different coatings (paint):

a water-based aliphatic polyurethane coating for concrete;

a water-based polycarbonate polyurethane coating for metal;

a water-based polyscrylate coating for metal; and a water-based aromatic polyester coating.

In each coating the coloring pigment was included in three concentrations: 1, 2 and 5% by weight. This was done by dispersing the coloring pigment in the paint using ultrasound activation. After a few hours, a substrate was painted with the coatings and these were cured. The color intensity and homogeneity of the coatings was very high. By light microscopy no inhomogeneities could be observed is the coatings.

X-ray diffraction spectra were recorded of the coloring pigment per se and of the aromatic polyester eating with 2% by weight of coloring pigment. The coloring pigment showed peaks at 3.69°, 2 θ, 7.36°, 2θ. The spectrum of the coating did not show any peaks at those points, which indicates that the clay was nanoscopically dispersed.

Example 5

Ten grams of a montmorillonite day EXM 757 with a cation exchange capacity of 95 meq/100 g was dispersed in 1 liter of deionized water of 50° C. The clay was allowed to swell for a period of 2 hours, until complete exfoliation had occurred. With x-ray diffraction it was determined that the distance between the clay sheets was 12.1 Å.

The clay thus obtained was subjected to an ion exchange with Methylene Green (MG). For a complete exchange, 4.1 grams of MG were used. This yielded a blue-green coloring pigment, which was washed, filtrated and freeze-dried With x-ray diffraction, it was determined that the distance between the clay sheets was 15.5 Å.

Example 6

Ten grams of a montmorillonite clay EM 757 with a cation exchange capacity of 96 meq./100 g was dispersed in 1 liter of deionized water of 50° C. The day was allowed to swell for a period of 2 hours, until complete exfoliation had occurred. With x-ray diffraction it was determined that the distance between the clay sheets was 12.1 Å.

The clay thus obtained was subjected to as ion exchange with Malachite Green (BG). For a complete exchange 3.3 grams of BG were used. This yielded a blue-green coloring pigment, which was washed, filtrated and freeze-dried. With x-ray diffraction, it was determined that the distance between the clay sheets was 22 Å.

Example 7

Ten grams of a montmorillonite day EXM 757 with a cation exchange capacity of 95 meq./100 g was dispersed in 1 liter of deionized water of 50° C. The clay was allowed to swell for a period of 2 hours, until complete exfoliation had occurred. With x-ray diffraction it was determined that the distance between the clay sheets was 12.1 Å.

The clay thus obtained was subjected to an ion exchange with Brilliant Green (BG). For a complete exchange 4.6 grams of BG were used, This yielded a green coloring pigment, which was washed, filtrated and freeze-dried: With x-ray diffraction, it was determined that the distance between the clay sheets was 22.7 Å.

Example 8

The preparations of the coloring pigments of Examples 1, 3 and 5–7 were repeated With a different clay, viz. a Bentonite with a cation exchange capacity, of 85 meq./100 g. The use of this clay, which has larger clay sheets, yielded comparable results with regard to the color intensity.

Example 9

Ten grams of a synthetic hydrotalcites ($Mg_3ZnAl_3(OH)_{12}$ $4H_2O$) were dispersed in 1 liter of deionized water of 40° C. at a pH of 3. The pH was adjusted with a 5 M HCl solution and checked with pH paper. The clay was allowed to well for a period of 1 hour until complete exfoliation had occurred.

The clay thus obtained was subjected to an ion exchange with Methyl Red. This coloring substance was used in a mole ratio of 2:1 with respect to the hydrotalcite. This yielded a yellow coloring pigment, which was washed, filtrated, freeze-dried and ground.

Example 10

Ten grams of a synthetic hydrotalcite ($Mg_3ZnAl_3(OH)_{12}$ $CO_3.4H_2O$) were dispersed in 1 liter of deionized water of 40° C. at a pH of 3. The pH was adjusted with a 5 M HCl solution and checked with pH paper. The day was allowed to swell for a period of 1 hour until complete exfoliation had occurred.

The clay thus obtained was subjected to an ion exchange with Fluoressein. This dye was used in a mole ratio of 2:1 with respect to the hydrotalcite. This yielded a red coloring pigment, which was washed, filtrated, freeze-dried and ground.

What is claimed is:

1. A method for preparing a coloring pigment, comprising the steps of treating an anionic or cationic clay by dispersing and swelling the clay in water at a temperature between 20 and 60° C. which water is substantially free of ions, whereby the agglomerates of clay sheets are substantially broken; and thereafter subjecting the clay, containing substantially no agglomerates of clay sheets to an ion exchange with an organic dye in the presence of a surfactant, a block copolymer or a graft copolymer.

2. A method according to claim 1, wherein the clay comprises clay sheets, the relative distance between the day sheets being at least 60 Å.

3. A method according to claim 1, wherein the clay is selected from the group of smectites, layered double hydroxides and hydrotalcites.

4. A method according to claim 1, wherein the organic dye is selected from the group consisting of acridine dyes, anthraquinone dyes, azine dyes, azo dyes, quinophthalone dyes, natural dyes, formazan dyes, indigo and indigoid dyes, indicator dyes, cationic dyes, leuco vat dyes, methine dyes, microscoping dyes, naphtho and benzoquinone dyes, nitro and nitroso dyes, phthalocyanine dyes, reactive dyes, and tri- and diaryl methane dyes.

5. The method of claim 4, wherein the azine dye is oxazine.

6. The method of claim 4, wherein the azine dye is thiazine.

7. The method of claim 4, wherein the methine dye is azomethine.

8. A method according to claim 1, wherein the organic dye comprises at least two functional or ionic groups.

9. A coloring pigment obtainable by a method according claim 1.

10. A method of coloring a polymeric material comprising applying the coloring pigment of claim 9.

11. A polymeric material colored with a coloring pigment according to claim 9.

* * * * *